(12) United States Patent
Kushler

(10) Patent No.: US 7,542,029 B2
(45) Date of Patent: Jun. 2, 2009

(54) SYSTEM AND METHOD FOR A USER INTERFACE FOR TEXT EDITING AND MENU SELECTION

(76) Inventor: Cliff Kushler, 20615 36th Pl. W., Lynnwood, WA (US) 98036

( * ) Notice: Subject to any disclaimer, the term of this patent is extended or adjusted under 35 U.S.C. 154(b) by 161 days.

(21) Appl. No.: 11/824,950

(22) Filed: Jul. 3, 2007

(65) Prior Publication Data

US 2008/0316212 A1    Dec. 25, 2008

Related U.S. Application Data

(63) Continuation of application No. 11/533,714, filed on Sep. 20, 2006, now Pat. No. 7,382,358.

(60) Provisional application No. 60/917,849, filed on May 14, 2007, provisional application No. 60/806,522, filed on Jul. 3, 2006.

(51) Int. Cl.
G06F 3/041    (2006.01)

(52) U.S. Cl. .................... 345/168; 345/169; 345/173

(58) Field of Classification Search ......... 345/168–183; 178/18.01–18.07, 19.01–19.06; 715/773, 715/863, 864

See application file for complete search history.

(56) References Cited

U.S. PATENT DOCUMENTS

| 5,574,482 | A | | 11/1996 | Niemeier | |
|---|---|---|---|---|---|
| 5,748,512 | A | * | 5/1998 | Vargas | ...................... 708/142 |
| 6,008,799 | A | | 12/1999 | Van Kleeck | |
| 7,098,896 | B2 | * | 8/2006 | Kushler et al. | .............. 345/168 |
| 7,382,358 | B2 | * | 6/2008 | Kushler et al. | .............. 345/168 |
| 7,453,439 | B1 | * | 11/2008 | Kushler et al. | .............. 345/168 |

* cited by examiner

*Primary Examiner*—Vijay Shankar
(74) *Attorney, Agent, or Firm*—Black Lowe & Graham PLLC

(57) ABSTRACT

Methods and system to enable a user of an input action recognition text input system to edit any incorrectly recognized text without re-locating the text insertion position to the location of the text to be corrected. The System also automatically maintains correct spacing between textual objects when a textual object is replaced with an object for which automatic spacing is generated in a different manner. The System also enables the graphical presentation of menu choices in a manner that facilitates faster and easier selection of a desired choice by performing a selection gesture requiring less precision than directly contacting the sub-region of the menu associated with the desired choice.

36 Claims, 10 Drawing Sheets

SYSTEM AND METHOD FOR A USER INTERFACE FOR TEXT EDITING AND MENU SELECTION

PRIORITY CLAIM

This application is a continuation of application Ser. No. 11/533,714 filed Sep. 20, 2006 which claims the benefit of Provisional Application Ser. No. 60/718,984. This application also claims the benefit of Provisional Application Ser. No. 60/806,522 filed Jul. 3, 2006 and 60/917,849 filed May 14, 2007 and are incorporated herein by reference.

FIELD OF THE INVENTION

The invention relates to graphical and gestural user interfaces for computer systems and, more specifically, to any of a variety of computer systems wherein a user performs input actions using one or more input devices, and wherein the data generated by such input actions are analyzed in order to recognize one or more such user input actions as corresponding to textual data that is entered into the computer system. The invention also relates to a graphical approach for presenting a menu of two or more choices to a user for selection by simple gestures that are quick and easy to perform, where such menu selections are performed as part of a text input method or for other control functions of the computer system.

BACKGROUND OF THE INVENTION

There are a wide variety of text input systems that are designed to enable the user to input text at increased rates. The increased rate of text input is often made possible by enabling the user to perform actions with less precision than is required by comparable systems, since it is generally possible to perform a given set of actions more rapidly when the actions can be performed with less precision. In general, this is achieved by defining a lexicon of textual objects that can be generated by the system, along with a basis on which input actions performed by the user are mapped to one or more of these textual objects in the lexicon. The system then analyzes (one or more) input actions performed by the user and determines which textual object is most likely the object intended by the user in performing the input actions, and generates the determined object as the text corresponding to the input actions. One example is the system disclosed by Robinson et al in U.S. Pat. No. 6,801,190, which is based on a virtual keyboard where the user is able to enter text by means of imprecise tapping. Another example is the "ShapeWriter" system (disclosed by Zhai in US patent publication US 2004-0120583 A1) that recognizes word patterns based on the shape of a traced path on a virtual keyboard by comparing them to a library of shape prototypes associated with words. Another example is the system disclosed by Kushler et al in U.S. Pat. No. 7,098,896.

In other systems (for example, speech recognition and handwriting recognition systems), the user is enabled to input text by inputting information in an alternate "modality" (i.e. by speaking in the case of a speech recognition system; by writing cursively in the case of handwriting recognition systems), rather than by performing actions in the same modality but with less precision (as in the case of the virtual keyboard of Robinson et al). In such "alternate modality" systems, the user's input actions (spoken words in the case of speech recognition; cursive text in the case of handwriting recognition) are likewise mapped ("recognized") as corresponding to one or more textual objects in the system's lexicon. Other systems inherently introduce ambiguity into the text input actions performed by the user, and consequently also need to map input actions performed by the user to one or more textual objects in a lexicon. A well-known example is the input system known commercially as "T9" (disclosed by Grover et al in U.S. Pat. No. 5,818,437) that is commonly used on cellular phone keypads with a limited number of keys, where each key of a subset of the standard phone keys is associated with a plurality of distinct letters, and a key sequence entered by a user is mapped to one or more words whose letters correspond to the letters associated with the keys in the input sequence.

Despite the differences in the nature of the input actions performed by the user in these various systems (hereinafter "input action recognition systems"), and in the manner in which these input actions are mapped to textual objects in the system lexicons, there are a number of characteristics that input action recognition systems generally have in common:

1) The textual objects identified by such input action recognition systems are output by a text presentation system (most commonly implemented as a region of a display device on which the text is displayed) such that the generated text can be further edited by the user.

2) There are instances in which a given input action (or sequence of input actions) is mapped to more than one possible corresponding identified textual object, and the identified textual object determined to most closely correspond to the input action(s) is subsequently output to the text presentation system.

3) The system can maintain a record (at least for a limited number of the most-recently generated textual objects) of one or more of the alternate textual objects also determined to correspond reasonably closely to the input action, and (at least temporarily) associate these alternate textual objects with the textual object actually generated for output. Alternatively or in addition, the system can record certain data or information regarding the input actions and associate this data with the record of the associated alternate textual interpretations, or re-process this recorded data regarding the input actions to identify alternate textual objects at a later time.

4) There are instances in which the identified textual object determined to most closely match the input action(s) that is output through the text presentation system is not the textual object that the user intended to generate, so that the user needs to edit the generated text so that it correctly corresponds with the text that the user intended to generate.

5) There is a text insertion location (or position) within the text presentation system where the next textual object generated by the user will be inserted. This is commonly referred to as the "cursor" (sometimes "caret") position (hereinafter the "text insertion position").

6) There is a text editing action (or "gesture") by means of which the user can change the text insertion position to a new location in the text presentation system. In the great majority of systems, the text presentation system comprises a text output region on a display. In mouse-based systems, for example, this action is, perhaps universally, a single click of the mouse performed within the text output region. In stylus-based touch-screen systems this action is, again, perhaps universally, a single tap of the stylus performed within the text output region.

7) There are in general two separate classes of characters into which characters processed by the system are classified. One class is comprised of those characters that can be validly used to form one or more of the textual objects generated by the system (hereinafter "textual object characters"). The second class is comprised of one or more characters or types of characters that are treated by the system as delimiter characters that are not contained in the textual objects generated by the system (hereinafter "delimiters"). The class of delimiter characters very commonly includes "white space" characters (space, tab, return, and so forth), and often other punctuation characters.

Another characteristic that tends to be shared by the vast majority of users across all of these disparate input action recognition systems is that users tend to perform input actions faster and faster (and consequently with less and less precision) until a certain number of "errors" start to occur, where an error is an instance in which the textual object that is output by the system to the text presentation system is not the textual object that the user intended to generate. Another characteristic that is common to virtually every text editing system is that any editing action performed by the user (wherein any text present in the text presentation system is modified by a user action) results in the text insertion position being re-located to the location of the edited text. While this behavior made sense (and was also in a sense unavoidable) in the original mouse-and-keyboard model for text editing, in many scenarios in the input action recognition systems described above, this behavior is no longer desirable. In the "text editing" that is necessitated by these scenarios, the user is in general trying to input a particular stream of text. At some point in the process, the user looks at the text output region (or otherwise examines the text presentation system) and notices that the text that has been generated differs in some way from the text that the user intended to generate, due to the fact that one or more of the user's preceding input actions were "incorrectly recognized" by the system so that one or more textual objects other than those intended by the user have appeared somewhere earlier in the text output region. In most cases, the user simply wishes to correct the incorrectly recognized text (in essence, to "re-map" or "re-edit" the system's interpretation of the original input action(s) performed by the user when the textual object was generated), and to continue to input new text at the current text insertion position. However, the problem remains that, with existing systems, it is not possible to edit any incorrectly recognized text without re-locating the text insertion position to the location of the edited text.

Standard desktop computing systems are almost universally equipped with a full-size desktop keyboard and a mouse (or mouse equivalent such as a trackball or a graphic tablet digitizer). As a result, the majority of users are comfortable and relatively efficient using a keyboard and mouse for text input on desktop systems. For portable, handheld devices, the desktop keyboard and mouse are impractical due to their size and the need (in the case of a standard mouse) for a flat, relatively stable surface. Consequently, many of the above input action recognition text input systems were either developed specifically for use on portable, handheld devices, or are often viewed as being particularly useful when used on such devices.

Portable computing devices continue to get more powerful and more useful. The touch-screen has proved to be a very useful, flexible and easy-to-use interface for portable devices. The touch-screen interface is used on a wide variety of portable devices, including larger devices such as Tablet PCs, but it has been found to be particularly effective on smaller devices such as PDA's and mobile phones. The development of such devices has largely been focused on two conflicting goals: one is making the devices smaller, and another is making them easier, faster and more convenient to use.

One user interface element that is commonly used in a wide variety of systems is to present a menu of choices to the user to allow the user to select a desired response among the alternatives presented. This user interface element is frequently used in the above input action recognition text input systems, since it is often necessary to present the user with a list of possible alternative textual interpretations of one or more input actions, and allow the user to select the correct interpretation that reflects the user's intention in performing the input actions. In a system based on a touch-screen interface, the most natural way to interact with an on-screen menu is to select the desired option simply by selecting it by contacting the desired menu selection with a stylus or a finger. It is often desirable to minimize the amount of display area required to display the menu, so that other elements on the display are not obscured. On the other hand, given that the user selects the desired menu option by touching it, the smaller the menu is the more precise the user must be in a selection action, and therefore the more difficult the menu is to use.

Thus, there is a natural tension in these usability aspects. A second similar consideration arises from the fact that another often desired design goal is to enable the user to use a touch-screen system with a finger, rather than requiring the use of a stylus or other specialized instrument for interacting with the screen. This creates the same tension, since a fingertip is generally less precise than a stylus, so designing a menu such that selections can be performed with the user's finger generally requires making the displayed menu substantially larger.

As mentioned above, in the prior art, making a selection from a touch-screen menu has required that the user directly contact the desired selection. In some implementations, the user is required to control the placement of the stylus such that the first contact of the screen by the stylus (or finger) occurs within the region associated with the desired selection. In other approaches, the user is allowed to initially contact the screen within any of the set of active selection regions, then slide the stylus until it is within the region associated with the desired selection (without breaking contact with the screen) before lifting the stylus. In the first approach, the initial contact location must be carefully controlled to achieve the desired selection, and in the second approach the final contact location must be similarly controlled. Since each menu selection item is represented as a given two-dimensional region of the displayed menu, in either approach the user is required to control the placement of the screen contact in two dimensions in order to effect the desired menu selection. The smaller each two-dimensional menu region is, the more precise the user must be in this contact action, and, in general, the more time will be required to make a menu selection.

SUMMARY OF THE INVENTION

The methods and systems of the present invention solve the problems described above for input action recognition text input systems by enabling the user to edit any incorrectly recognized text without re-locating the text insertion position to the location of the edited text. In one aspect, as the user generates text to be inserted in the text output region, the text editing system of the present invention tracks and records the location of the text insertion position within the text output region so that the text insertion position can be automatically restored to this location immediately following the "re-editing" of incorrectly recognized text.

In another aspect, the system defines a text editing user action (or "gesture") that is distinct from that which is used to change the text insertion position to a new location in the text output region, and wherein this distinct text editing user action is performed to indicate that the user wishes to change a previously generated (but incorrectly recognized) textual object to one of the alternate textual objects associated with the textual object actually generated for output (hereinafter, the "Re-Edit" gesture). For example, in a stylus-based touch-screen system where a single tap of the stylus is performed to change the text insertion position to a new location within the text output region, a distinct Re-Edit gesture can be defined as a "double tap" of the stylus (two taps occurring within a threshold maximum distance of each other with no more than a threshold maximum time interval between the two consecutive taps) that occurs near a previously output textual object in the text output region. When the system detects that the user has performed the Re-Edit gesture in a region associated with a previously output textual object, the textual object is replaced in the text output region by a selected one of the alternate textual objects associated with the one or more input actions which resulted in the generation of the original textual object (either a default selection or a selection performed by the user), and the text insertion position is then automatically restored to its previous location (prior to the detection of the Re-Edit gesture).

When the alternate textual object that replaces the original textual object is to be selected by the user, often the most effective user interface is to present the user with a menu of alternate textual objects from which to select the desired textual object. The present invention further enhances the speed and ease with which such selections can be made by enabling the user to make a selection from a menu of choices without having to control the screen contact action so that it either begins or ends within the two-dimensional menu region associated with the desired menu selection. Instead, the menu choice that is activated by the user's screen contact action is determined by the segment of the menu's outermost boundary that is crossed by the path of the contact action, where each segment of the menu boundary is associated with one of the menu selections. In this approach, the initial contact can occur anywhere within the displayed menu, and is not restricted to having to start (or end) within a region that is (or appears to be) associated with the particular desired textual object. Even greater efficiencies can be obtained by utilizing the menu selection system of the present invention whenever a selection needs to be made between two or more possible choices.

BRIEF DESCRIPTION OF THE DRAWINGS

The embodiments of the present invention are described in detail below with reference to the following drawings.

DETAILED DESCRIPTION OF THE PREFERRED EMBODIMENT

Figure 1:
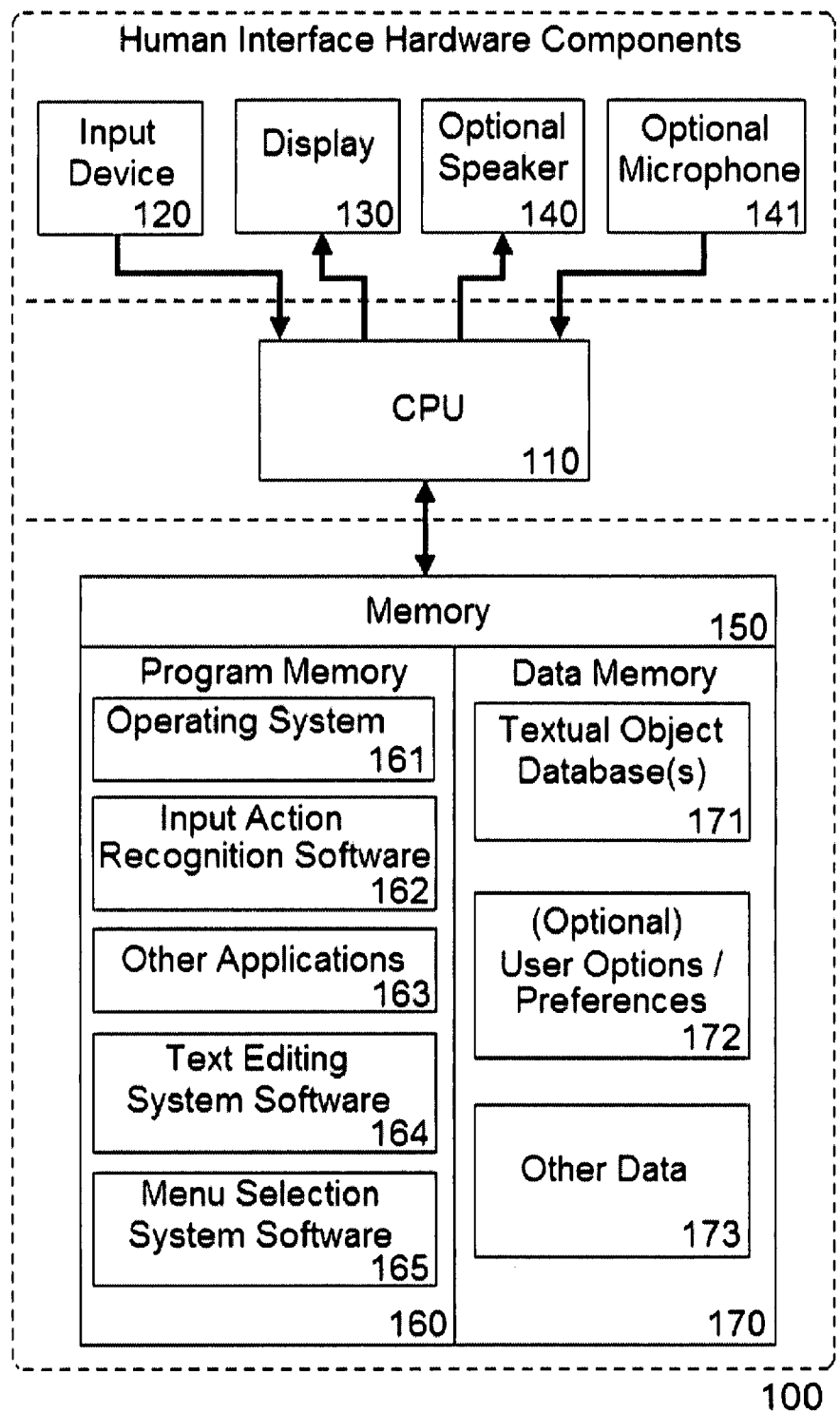
FIG. 1 shows a structural system block diagram showing the typical hardware components of a system that embodies the methods of the text editing and menu selection systems of the present invention as shown in FIGS. 2A, 2B, and 2C and in FIGS. 3A, 3B and 3C.

The system of the present invention enables the user to accomplish the goal of correcting text that has been incorrectly recognized by an input action recognition system without unnecessarily interfering with the user's process of entering and editing text. When an intended word or phrase is incorrectly recognized (where one or more input actions have been "mapped" to text other than that intended by the user in performing the input actions), the user must correct the mis-recognition of the system, but this correction does not reflect an intention by the user to change or edit the user's intended text, but rather only to "re-map" or "re-edit" the system's interpretation of the original input action(s) performed by the user when the textual object was generated. When the user notices that the system has mis-recognized one or more previous input actions, the system of the present invention enables the user to correct the mis-recognized text, and then continue to input text at the original location of the text insertion position with a minimum of effort since the text insertion position is automatically restored to its original location.

In one aspect, as the user generates text to be inserted in a text output region, the system tracks and records the location of a text insertion position within the text output region so that, when appropriate, a text insertion position can be automatically restored to this location. In another aspect, the system defines a text editing user action (or "gesture") that is distinct from that which is used to change the text insertion position to a new location in the text output region, and wherein this distinct text editing user action is performed to indicate that the user wishes to change a previously generated (but incorrectly recognized) textual object to one of the alternate textual objects associated with the textual object actually generated for output (hereinafter, the "Re-Edit" gesture). For example, in a stylus-based touch-screen system where a single tap of the stylus is performed to change the text insertion position to a new location within the text output region, a distinct Re-Edit gesture can be defined as a double tap of the stylus near a previously output textual object in the text output region. When the system detects that the user has performed the Re-Edit gesture in the region associated with a previously output textual object, the textual object is replaced in the text output region by one of the associated alternate textual objects (as described below), and the text insertion position is then automatically restored to its previous location (prior to the detection of the Re-Edit gesture).

In the following descriptions of various aspects and embodiments of the present invention, a particular aspect or embodiment is often described and exemplified in the context of an implementation on a stylus-based touch-screen system. However, it will be evident to one of ordinary skill in the art that these various aspects and embodiments apply equally to systems in which input actions are performed using a standard mouse and keyboard, a touch-screen system that does not require the use of a stylus, an alternative form of mouse (for example, an "eye-gaze" system that tracks the movement of the user's eyes to determine the screen location at which the user is gazing and automatically positions the system mouse cursor at that location, and which monitors eye-blinks or some other mechanism to enable the user to perform various mouse-clicks), a system based on voice commands, or systems that use some other means to enable the user to perform input actions to generate text and/or to execute editing actions on already entered text.

In another aspect, the system allows the user to select a word in the output text for re-editing by highlighting the word to be edited (or by positioning the text insertion position within or adjacent to the boundaries of the word) and then activating a designated "Re-Edit" editing function key (in this case, the system must track the previous two locations of the text insertion position in order to restore it to its position prior to the re-location of the text insertion position that was performed in order to activate the Re-Edit function. In another aspect, to make the process of correcting such recognition errors as efficient as possible, the system recognizes when the Re-Edit gesture is performed in the output text region, and identifies the word in the output text region closest to where the pre-determined stylus action or gesture was performed as the target word for re-editing. In one embodiment, as mentioned in a prior example, the pre-determined editing action is a "double-tap" of a stylus on a word displayed on a touch-screen. In another embodiment (for example, where the system is operated using a cursor movement control device such as a mouse), the pre-determined editing action is (for example) to briefly hover the mouse over the word to be edited, then quickly move the mouse back and forth one time (this is simply an exemplary gesture, as many such gestures can be defined).

In another embodiment, the Re-Edit gesture is defined such that a plurality of words can be selected with a single gesture. For example, in a speech recognition system, recognition errors commonly affect more than one word in the generated output. An example of this might be where the user utters "It's hard to recognize speech" and the output generated by the system is "It's hard to wreck a nice beach." In such systems, the Re-Edit gesture may be defined, for example, as a line drawn through a sequence of words, where in the example above, a line would be drawn through the phrase "wreck a nice beach." The system would then generate one or more alternate interpretations of the associated utterance without changing the interpretation of the portion of the utterance corresponding to "It's hard to". This same approach is applicable to handwriting recognition systems, where a recognition error will often break a segment of the user's handwriting that is intended to be a single word into two or more words. Of course, other Re-Edit gestures may be defined, such as a circle drawn around the sequence of words to be Re-Edited, and are not to be considered outside the scope of the present invention. For example, in a speech recognition system, the Re-Edit "gesture" may be defined as a spoken command, which in the current example could be a spoken phrase such as "Re-Edit: wreck a nice beach."

In one aspect, the system stores a list of the alternate textual objects identified as being those most closely corresponding to one or more input actions for one or more of the most recently output textual objects. When the Re-Edit gesture is detected, the system then displays a textual object selection list containing the list of alternate textual objects originally identified as the most likely matching textual objects determined with respect to the original input action(s) performed by the user resulting in the output of the textual object being Re-Edited. In another embodiment, the originally output textual object is omitted from the displayed textual object selection list since the Re-Edit procedure is (in general) only performed in order to replace it. In another aspect, the textual object to be Re-Edited is automatically replaced with the next-most-closely corresponding alternate textual object from the list of the alternate textual objects identified as being those most closely corresponding to the input action(s) from which the textual object to be Re-Edited was generated (without requiring the user to select a textual object from a displayed textual object selection list). This approach can be advantageous in systems where, in the majority of cases, the user's intended textual object is next-most-closely corresponding alternate textual object. In another aspect, when a textual object is Re-Edited that has already been Re-Edited and thus corresponds to the next-most-closely corresponding alternate textual object that has automatically replaced the originally output textual object, the system then displays a textual object selection list to allow the user to select an alternate textual object.

FIG. 1 shows a simplified block diagram of the hardware components of a typical device 100 in which the System and Method for a User Interface for Text Editing and Menu Selection is implemented. The device 100 includes one or more input devices 120 that provide input to the CPU (processor) 110 notifying it of actions performed by a user, typically mediated by a hardware controller that interprets the raw signals received from the input device and communicates the information to the CPU 110 using a known communication protocol via an available data port. One example of an input device 120 is a touch-screen that provides input to the CPU 110 notifying it of contact events when the touch-screen is touched by a user. Similarly, the CPU 110 communicates with a hardware controller for a display 130 to draw on the display 130. One example of a display 130 is a touch-screen display that provides graphical and textual visual feedback to a user. Optionally, a speaker 140 is also coupled to the processor so that any appropriate auditory signals can be passed on to the user as guidance (predominantly for error signals), and a microphone 141 is also coupled to the processor so that any spoken input can be received from the user (predominantly for input action recognition systems implementing speech recognition as a method of text input by the user). The processor 110 has access to a memory 150, which may include a combination of temporary and/or permanent storage, and both read-only and writable memory (random access memory or RAM), read-only memory (ROM), writable non-volatile memory such as FLASH memory, hard drives, floppy disks, and so forth. The memory 150 includes program memory 160 that contains all programs and software such as an operating system 161, an input action recognition system software 162, and any other application programs 163. The program memory 160 also contains at least one of a text editing system software 164 for recording and restoring the location of a text insertion position according to the method of the present invention, and a menu selection system software 165 for graphically displaying two or more choices to a user and determining a selection by a user of one of said graphically displayed choices according to the method of the present invention. The memory 150 also includes data memory 170 that includes any textual object database(s) 171 required by the input action recognition system software 162, optional storage for maintaining a record of user options and preferences 172, and any other data 173 required by any element of the device 100.

Figure 2A:
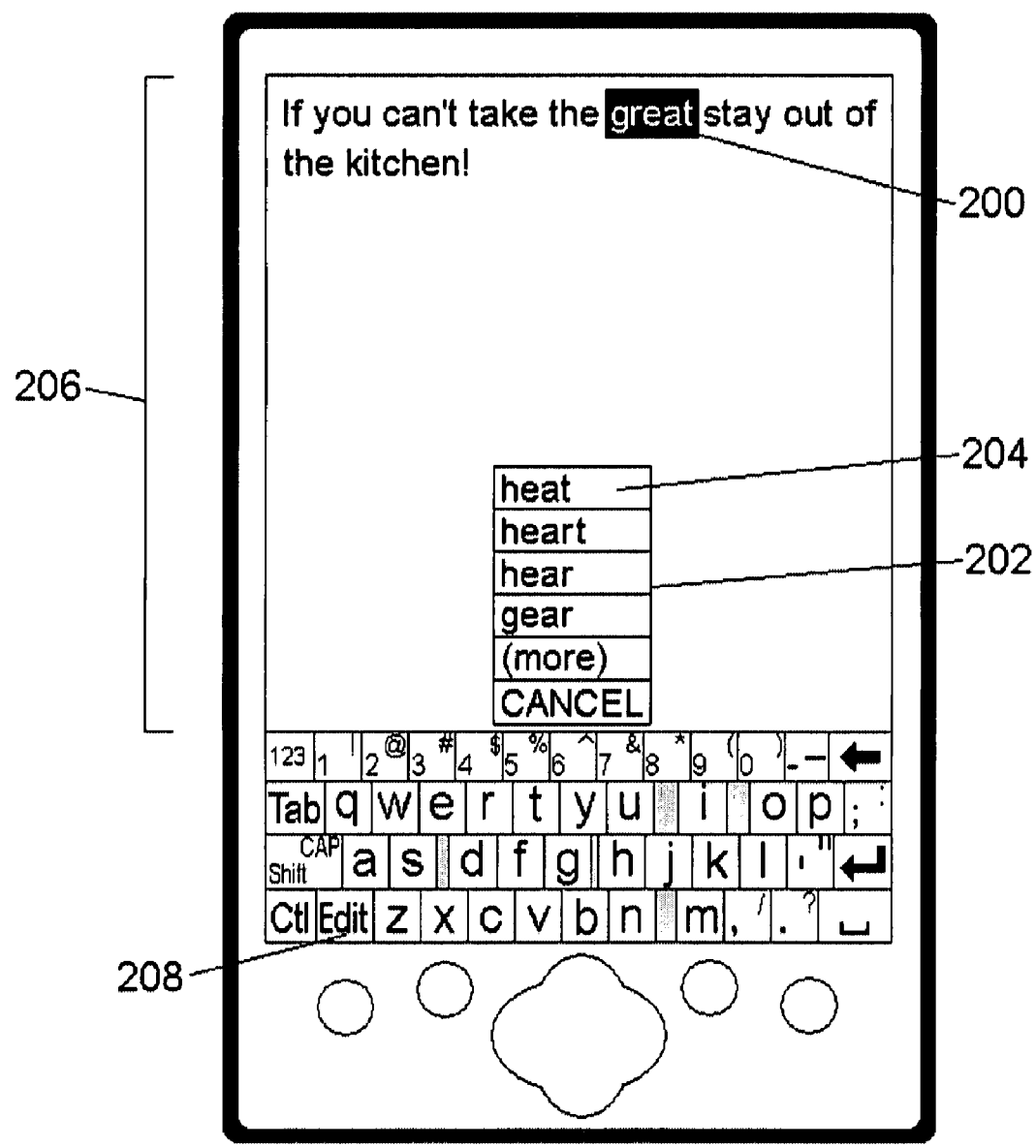
FIG. 2A shows an example of a textual object that is being Re-Edited according to an aspect of the method of the present invention.

FIG. 2A shows how the Re-Edit procedure can be activated by a Re-Edit function key 208 presented on the display 130 of the system 100, or by performing the pre-determined Re-Edit gesture on a previously output textual object ("great" 200 in FIG. 2A) to correct an output textual object that does not correspond to the user's intended textual object. In another embodiment, when the Re-Edit function key 208 is activated and no textual object is currently highlighted, the system identifies the textual object containing or adjacent to the current text insertion position and automatically selects it as the target of the Re-Edit procedure.

FIG. 2A shows a resulting textual object selection list 202. In this example, the originally intended textual object "heat" appears as a first textual object 204 in the textual object selection list 202 because it was determined to be the second-most-closely matching textual object with respect to the original input action (following the word "great" which was originally output as the textual object corresponding to the original input action). When the user selects the textual object 204 in the textual object selection list 202 using the input device 120, the processor 110 automatically replaces the highlighted textual object "great" 200 with the originally intended textual object "heat" in a text output region 206 on the display.

In another aspect, the Re-Editing process inserts or deletes spaces according to the manner in which spaces are automatically generated by the input action recognition system software 162. When an input action recognition system automatically generates spaces between textual objects, if a space is automatically generated between every pair of adjacent textual objects, there will often be situations in which the user will need to delete an unwanted but automatically generated space. For example, in English it is common to add the textual object "'s" (apostrophe-s) to the end of a noun to create a possessive form of the noun. In French, when the articles "le" and "la" precede a word that begins with a vowel, they are written as "l'" (l-apostrophe) with no space between the apostrophe and the first letter of the following word. In other languages such as German, it is common to construct longer "compound" words from two or more words that are concatenated together. Although other approaches to solving this problem are possible, and are not considered outside the scope of the present invention, a simple approach to solving this problem in an input action recognition system is to flag certain textual objects as exceptions to the usual rule of automatically generating a space between adjacent textual objects. For example, in English, the textual object "'s" (apostrophe-s) is flagged in the system's database of textual objects to indicate that a space is to be generated between it and following textual objects, but not between it and preceding textual objects. In contrast, in French, the textual object "l'" (l-apostrophe) is flagged in the system's database of textual objects to indicate that a space is to be generated between it and preceding textual objects, but not between it and following textual objects. In another aspect, to accommodate languages such as German, where different textual objects that are normally separated by spaces but that are also commonly concatenated to create longer "compound" textual objects, the input action recognition system includes a function that can be activated to suppress the automatic generation of a space the next time that it would normally occur (so that two such textual objects can be generated in succession without the generation of an intervening space by the system). Alternatively, the function suppresses the automatic generation of any spaces that would normally be generated until the function is activated to re-enable the automatic generation of spaces. Alternatively, the input action recognition system includes a function that removes the most recently generated automatic space. As described below, the Re-Edit processing of the current invention accommodates these various exceptions in the automatic generation of spaces, so that Re-Edited text is generated with the proper spacing when a textual object is replaced in the Re-Editing process by a textual object that is governed by different rules regarding automatic spacing.

In another aspect, the Re-Edit gesture is defined such that a sub-string of a single contiguous string of textual object characters can be selected with a single gesture. In the example shown in FIG. 2B, the word "of's" 210 is comprised of the words "of" 212 and "'s" 214. Note that in this example, these two textual objects were created in response to two separate input actions performed in succession. Note also that this text was generated on a user input action recognition system which, by default, automatically outputs a space between successively generated textual objects, but wherein the textual object "'s" 214 is flagged in the system's database of textual objects as an exception to this default behavior so that no space is generated prior to outputting "'s" 214 so that it is concatenated to the end of the preceding textual object to create its correct possessive form. However, in the example shown in FIG. 2B, the textual object "'s" 214 was not the textual object intended by the user when the corresponding input action was performed.

Figure 2B:
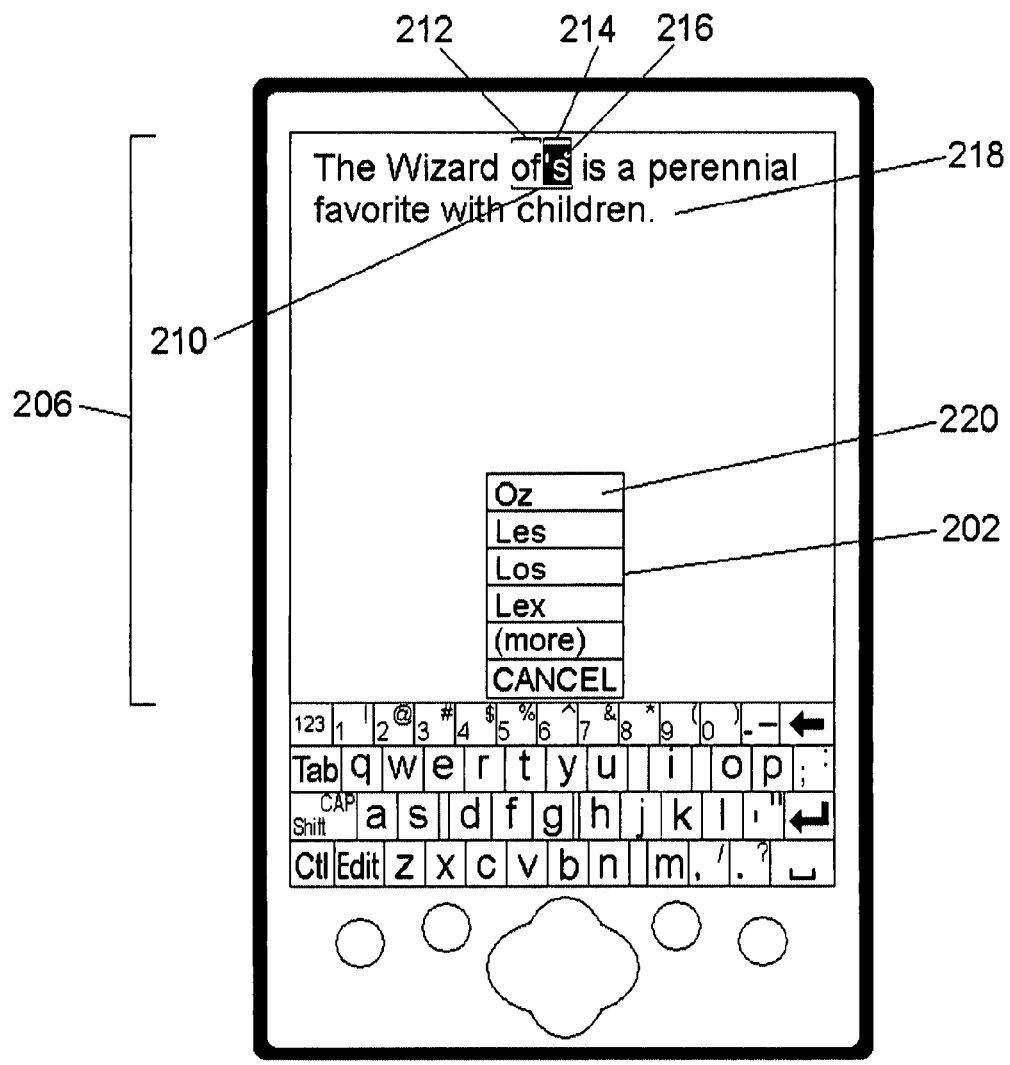
FIG. 2B shows an example of two concatenated textual objects wherein one is being Re-Edited according to an aspect of the method of the present invention.

In another aspect, when the Re-Edit gesture is detected in the region associated with a text string comprised of textual object characters and bounded by one or more delimiter characters before and after (in the example of FIG. 2B, the text string "of's" 210), the system first determines whether the complete text string ("of's" 210 in the example of FIG. 2B) was generated in response to a single user input action, and if so, the system responds in the manner described above based on the alternate textual objects identified for the input action. In another aspect, if the identified text string ("of's" 210 in the current example) was generated in response to two or more separate user input actions, from each of which a component sub-string textual object was generated, the system identifies the component sub-string textual object that is closest to the performed Re-Edit gesture, and, for example, the identified component sub-string textual object is highlighted and a list of the alternate textual objects associated with the user input action from which the component sub-string textual object was generated is displayed to the user for selection. In FIG. 2B, the location 216 associated with the detected Re-Edit gesture (for example, a double-tap at location 216) is nearest to the component sub-string "'s" 214 which has been identified as the Re-Editing "target" and has been highlighted in the text output region 206. In the example of FIG. 2B, the user has just finished entering a complete sentence, so that, prior to the detection of the Re-Edit gesture at location 216, the text insertion position was located at the end of the just-entered sentence at location 218, such that the user is ready to enter the next sentence.

Figure 2C:
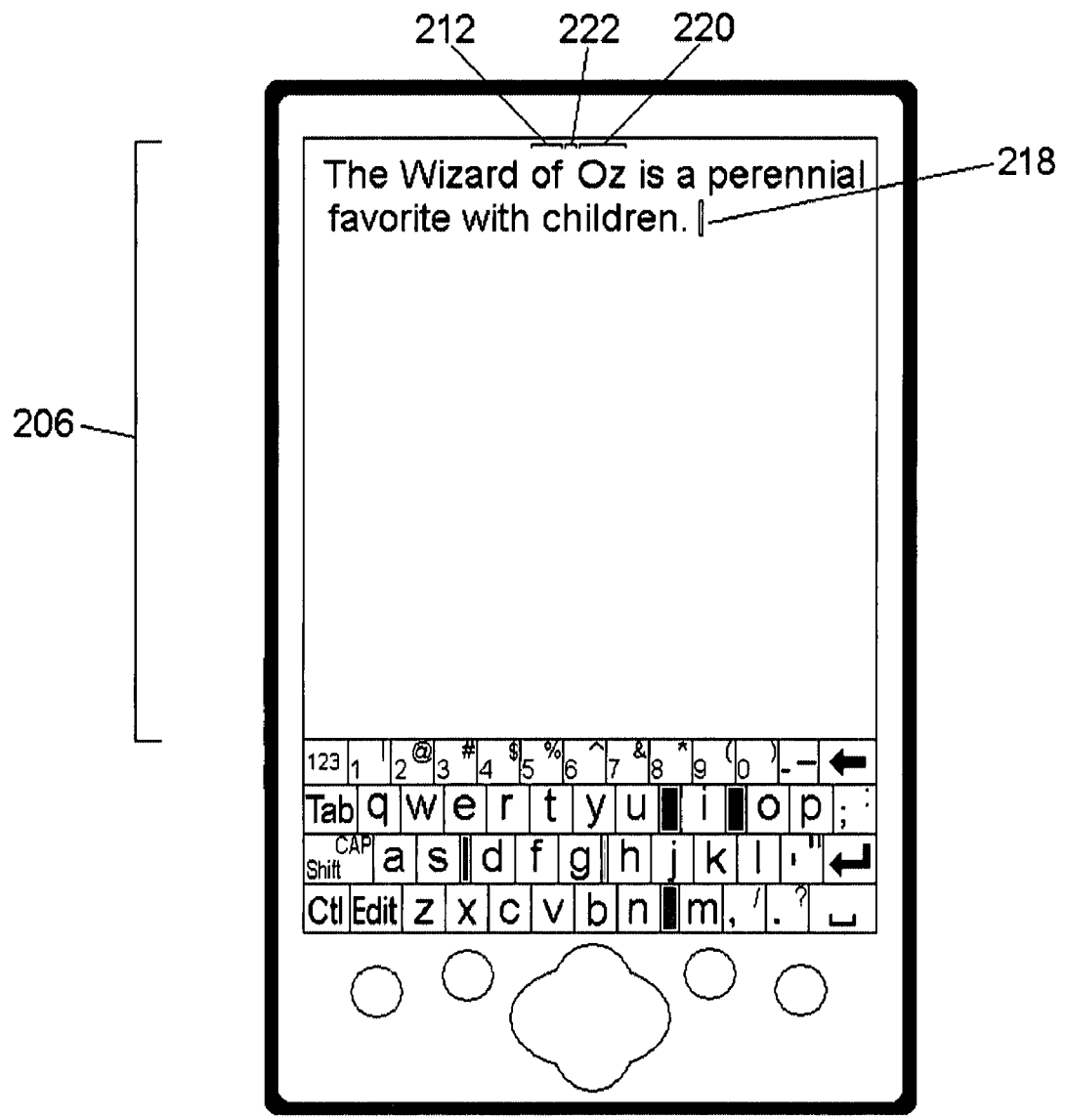
FIG. 2C shows an example of the result of Re-Editing one of two concatenated textual objects from FIG. 2B according to an aspect of the method of the present invention.

In this example, the originally intended textual object "Oz" appears as the first textual object 220 in the textual object selection list 202 because it was determined to be the second-most-closely matching textual object with respect to the original input action (following the textual object "'s" 214 which was originally output as the textual object corresponding to the original input action). FIG. 2C shows the result of selecting the textual object "Oz" 220 in the textual object selection list 202 causing the text editing system software 164 to automatically replace the highlighted textual object "'s" 214 with the originally intended textual object "Oz" 220 in the output text region 206. Notice that a space 222 has also been inserted by the text editing system software 164 between the preceding textual object "of" 212 and "Oz" 220. As stated earlier, the textual object "'s" 214 is flagged in the system's database of textual objects 171 as an exception to the default behavior of automatically generating a space between successively generated textual objects, so that no space was originally generated prior to outputting "'s" 214 in FIG. 2B. The selected replacement textual object "Oz" 220 is not flagged as such an exception in the system's database of textual objects 171, so that when the system replaces the textual object "'s" 214 with the textual object "Oz" 220, a space is generated prior to inserting the replacement text so that a space 222 appears between the words "of" 212 and "Oz" 220. Similarly, if the situation were reversed and the textual object "Oz" 220 had been originally generated and subsequently was replaced in a Re-Editing procedure with the textual object "'s" 214, a space 222 would have originally been generated preceding the textual object "Oz" and, when "Oz" 220 was replaced by "'s" 214, this preceding space would be deleted so that "'s" 214 would be directly concatenated to the preceding textual object. Thus, in another aspect, when one textual object is replaced with another as a result of a Re-Editing procedure, and differing automatic spacing behaviors are associated with the two textual objects, the spacing surrounding the replacement textual object is adjusted to account for the difference in the spacing behaviors associated with the two textual objects.

In another embodiment, the text editing system software 164 tracks the location of the text insertion position in the text output region 206, and immediately following the replacement of a Re-Edited textual object with an alternate textual object, the text insertion position is automatically restored to its former location in the output text prior to the performance of the Re-Edit procedure. In the example of FIG. 2C, following the replacement of the textual object "'s" 214 with the textual object "Oz" 220, the text insertion position is automatically restored to its original location 218 at the end of the completed sentence (its location prior to the detection of the Re-Edit gesture at location 216), so that the user can continue entering text without having to manually re-locate the text insertion position. In another aspect, when the generated textual object selection list is cancelled without selecting a replacement textual object, the identified textual object remains highlighted (selected) and the text insertion position is not restored to its former location in the output text so that other actions may be taken with respect to the still-highlighted identified textual object. In another aspect, when one or more additional input actions are performed prior to selecting a replacement textual object from the generated textual object selection list, the textual object selection list is automatically cancelled, the text insertion position is not restored to its former location in the output text, and the text generated in response to the one or more additional input actions is sent to the text output region and, in accordance with the standard behavior of word processing programs, consequently replaces the previously output textual object by virtue of the fact that the previously output textual object is the currently highlighted (selected) text region. In another aspect, an input action that corresponds to the generation of a control character results in sending a control character to the target text application. For example, an input action corresponding to the generation of a control-B is performed and the target application receives the control-B and applies bold formatting to the highlighted previously output textual object. In another aspect, when the system detects that the user has scrolled the displayed text region such that the location of the text insertion position is no longer visible on the display screen when the Re-Edit gesture is performed, the text insertion position is not restored to its former (no longer visible) location in the output text when an alternate textual object is selected from the automatically generated textual object selection list. In another aspect, the various possible responses of the system to the predetermined Re-Edit gesture and subsequent actions (including, for example, the action of restoring the text insertion position to its former location in the output text) are determined by the user by selecting from among a set of system preferences.

These aspects of the system greatly increase the efficiency of its use for text input. Input action recognition systems inherently result in a number of incorrectly generated textual objects that are in general randomly distributed throughout the previously generated text. In most cases, the user simply needs to correct the incorrectly generated textual objects, and continue entering text at the point where the user paused to review the previously output text. The ability of the system to track and automatically restore the text insertion position provides a significant benefit to the user who would otherwise have to tediously move the text insertion position back to its original location. By making the error-recovery procedure extremely efficient, the system's overall efficiency is greatly enhanced in two ways. First, obviously, the occasional error becomes simple to correct and little time is consumed in the process, so the overall effective input speed is increased. Secondly, because the error-recovery process is so simple and easy, most users will tend to be less concerned about the possibility of recognition errors, and will consequently perform text input actions more rapidly and with less concern for precision. With many input action recognition systems, this often generally leads to faster overall input speeds.

In another aspect, the text editing system software 164 detects when the user has re-located the text insertion cursor within the text output region, and modifies automatic system behaviors with respect to aspects of the surrounding context of the new location of the text insertion position. In one aspect, when the system in general automatically outputs spaces between generated words, and where the system detects that the text insertion position has been moved to a new context, the system disables the automatic output of a space prior to the first word output in the new context. In another aspect, when the system detects that the text insertion position has been moved to a new context and such automatic spacing is enabled, the system examines the character to the left of the new text insertion position, and when the character to the left of the text insertion position is a "white space" character, and/or when the text insertion position is at the first character position of a text field, and/or when the text field is a password-entry field, the system automatically disables the automatic output of a space prior to the first word output in the new context.

In another aspect, when a textual object is re-edited by the user, a list of one or more alternative textual objects is presented to the user for selection of the textual object intended by the user. These alternative textual objects correspond to alternative "mappings" by the input action recognition system of the one or more input actions originally mapped by the system to the textual object being re-edited. In another aspect, the list of alternative textual objects is presented for selection by the user in a special graphical presentation that enables the user to indicate the desired selection with a simple and intuitive gesture that in general requires less precision than menu selection methods known in the prior art and which therefore further speeds up the re-editing process by speeding up the process of selecting the intended object. In another aspect, this same special graphical menu presentation is utilized elsewhere in the user interface to correspondingly speed up the process of selecting from two or more alternate choices elsewhere in the system. The graphical presentation and gestural selection method of the present invention is particularly effective when one or more of the possible alternative selection choices presented has a higher than average a priori probability of being the user's intended choice. This is frequently the case in many situations where the user is offered a choice.

Figure 3A:
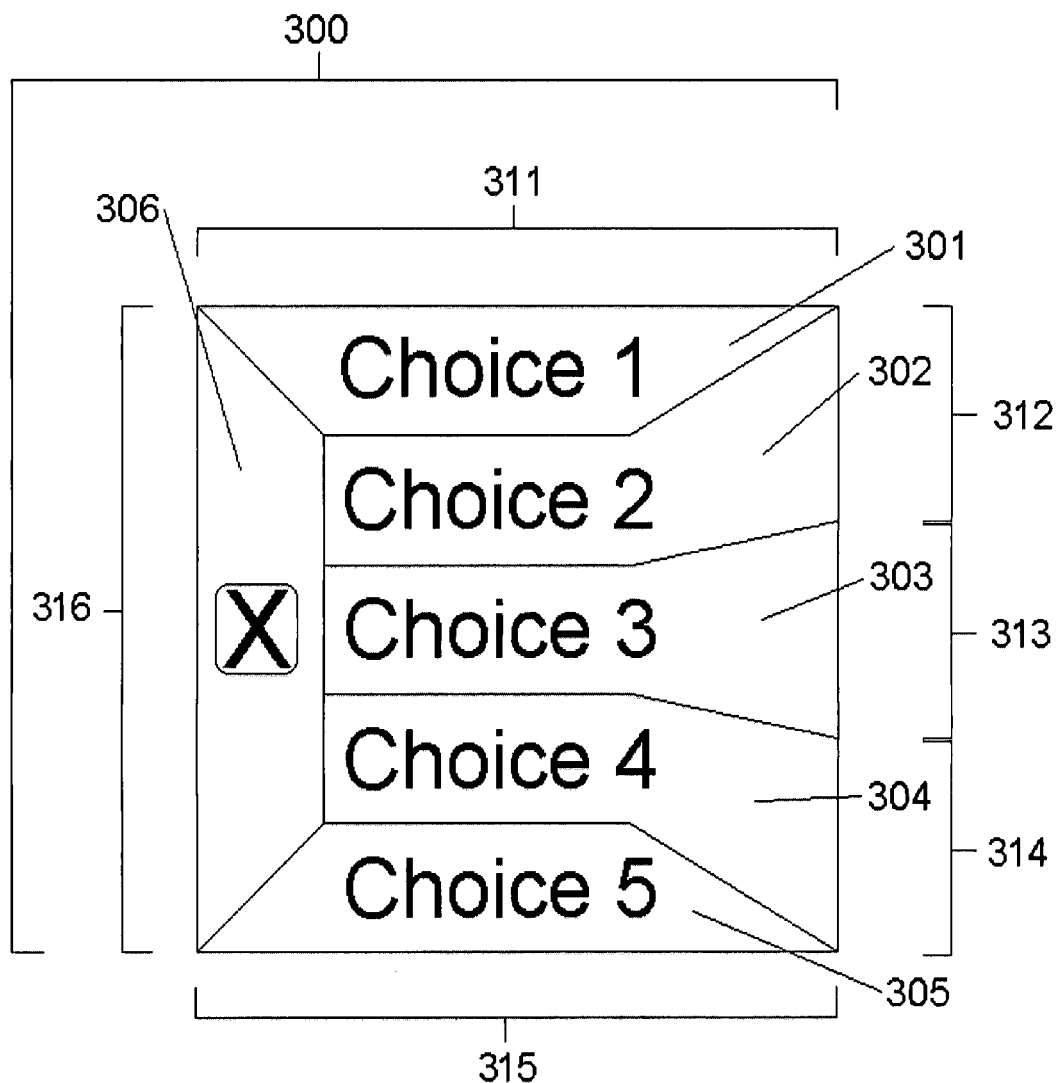
FIG. 3A shows an example of a menu that is structured in one way that takes advantage of the method of the present invention.

FIG. 3A shows an example of a menu 300 that is structured in one way that takes advantage of the method of the present invention. The example shown in FIG. 3A contains six selection sub-regions: five selection sub-regions 301-305 for Choice 1 through Choice 5, and a sixth sub-region 306 labeled with an icon designating this selection as an action to cancel the menu 300. Each of the six selection sub-regions 301-306 is associated with a corresponding segment 311-316 of the perimeter boundary of the menu 300. In the present invention, a menu selection is made by initially contacting the screen anywhere within the region enclosed by the outermost perimeter boundary of the menu and remaining in contact with the screen while tracing a path that exits the menu region through the segment of the menu perimeter boundary that is associated with the desired selection, then terminating the contact action by breaking contact with the screen (e.g. lifting the stylus) at a location that is outside the perimeter boundary of the menu 300. Alternatively, the menu selection is made effective as soon as the contact action exits the menu region, without requiring the termination of the contact action. Requiring the termination of the contact action to make the menu selection effective potentially allows a user to correct a pending selection by re-entering the menu region without breaking contact, then exiting through a different segment of the menu perimeter boundary prior to terminating the contact action. While the example described here involves the use of a touch-screen, where the act of contacting and breaking contact with the screen effectively "activates" and "de-activates" the point of control determined by the location of the stylus (or finger, or other contacting means), other approaches are not to be considered outside the scope of the present invention. For example, the point of control can be the cursor controlled by the movement of a mouse, which is "activated" and "de-activated" by clicking and releasing, respectively, the mouse button.

Figure 4:
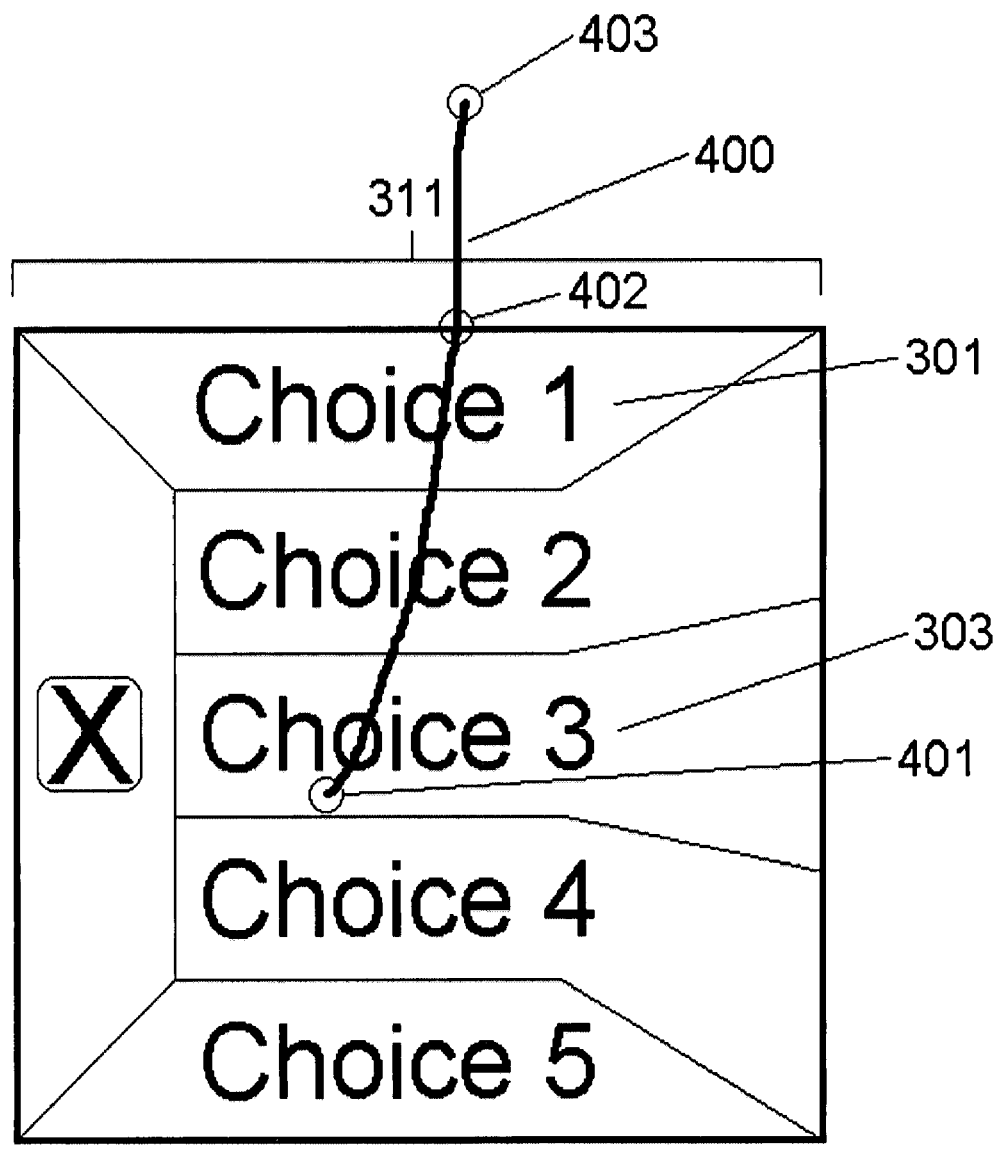
FIG. 4 shows an example of a contact action on a menu that is structured in one way that takes advantage of the method of the present invention.

In FIG. 3A, the segment of the perimeter boundary of the menu 300 that is associated with a menu selection sub-region is that segment of the menu's perimeter boundary that is also part of the perimeter boundary of the menu selection sub-region itself. The example menu shown in FIG. 3A shows that Choice 1 in selection sub-region 301 is associated with the menu perimeter boundary segment 311 that comprises the entire top border of the menu 300, which can be selected by contacting the screen anywhere within the menu 300, stroking upward to exit the menu region at the top, and breaking contact with the screen. FIG. 4 shows an example of a contact action 400 that begins at an initial contact location 401, exits from the menu at exit location 402 on the perimeter boundary segment 311, and terminates at a final contact location 403.

The result of contact action 400 is the selection of menu choice 301 ("Choice 1") even though the initial contact location is within menu selection sub-region 303 that is associated with "Choice 3."

One advantage of the present invention is that a user can in general make menu selections much faster because the contact action can be much less precise and can therefore be performed much more quickly. Further advantage can be gained when there is an a priori expectation that certain menu selections are more likely to be selected than others. Assume, for example, that in the case of the menu shown in FIG. 3A, it is known in advance that menu selections 301 ("Choice 1") and 305 ("Choice 5") each tend to be selected more than twice as frequently as any of selections 302, 303 or 304. The example menu shown in FIG. 3A is designed so that the entire top border segment 311 of the menu perimeter boundary is associated with selection sub-region 301 of "Choice 1" and the entire bottom border segment 315 of the menu perimeter boundary is associated with selection sub-region 305 of "Choice 5." In this example menu, segments 311 and 315 are both nearly three times longer than each of segments 312, 313 and 314 (associated with selection sub-regions 302, 303 and 304, respectively), so that "Choice 1" and "Choice 5" are significantly easier to select, since there can be a wide margin of error in quickly tracing a path that exits the menu by crossing through the corresponding segments. It is a simple matter to design the various menu selection sub-regions so that the relative lengths of the associated perimeter boundary segments approximate, within a reasonable tolerance, the relative expected probabilities of the various menu selections.

Figure 3B:
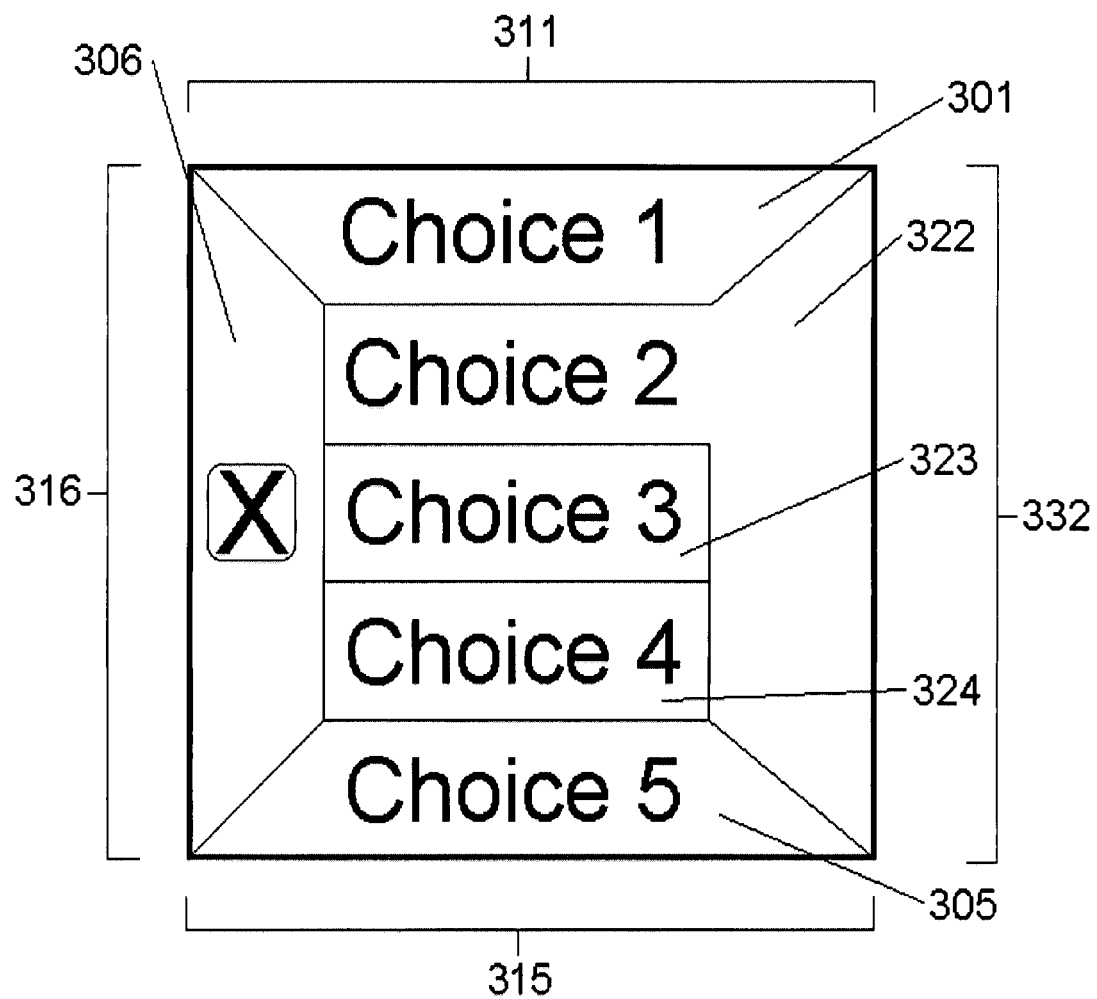
FIG. 3B shows an example of a menu that is structured in one way that takes advantage of the method of the present invention, where two of the presented choices have a lower a priori probability of corresponding to the user's intended selection.

Another significant advantage of the present invention is that a contact action that begins within the region enclosed by the outermost perimeter boundary of the menu but never exits the menu by crossing over the perimeter boundary can still be interpreted as a traditional menu selection—in other words, as a selection of the menu selection sub-region that is "tapped." This allows the improved menu selection approach of the present invention to be introduced in systems where the user has never received any instruction or information regarding this new menu selection approach. A user with no knowledge of the new selection approach can successfully use traditional menu selection "tapping" until such time as the new menu selection method is discovered or otherwise introduced. This also adds further flexibility in menu design, as menu selection items of very low a priori probability can be displayed as "land-locked" menu selections for which the border of the menu selection does not include any segment of the menu's outer perimeter boundary. This frees up more of the available menu perimeter boundary length to be allocated to other menu selection choices of correspondingly higher probability. For example, FIG. 3B shows an example of a possible menu arrangement with the same set of choices as that in FIG. 3A. FIG. 3B, however, shows a menu arrangement for a set of menu choices wherein "Choice 2" (322) has a much higher a priori probability of being selected than in FIG. 3A, and both "Choice 3" and "Choice 4" have much lower a priori probabilities of being selected than in FIG. 3A. In the example of FIG. 3B, the entire right side 332 of the menu is associated with "Choice 2", while both "Choice 3" and "Choice 4" must be selected by contacting the screen directly within the associated menu selection sub-regions 323 and 324 respectively, then breaking the contact without exiting from the desired menu selection sub-region (i.e. using traditional menu selection "tapping").

Figure 5:
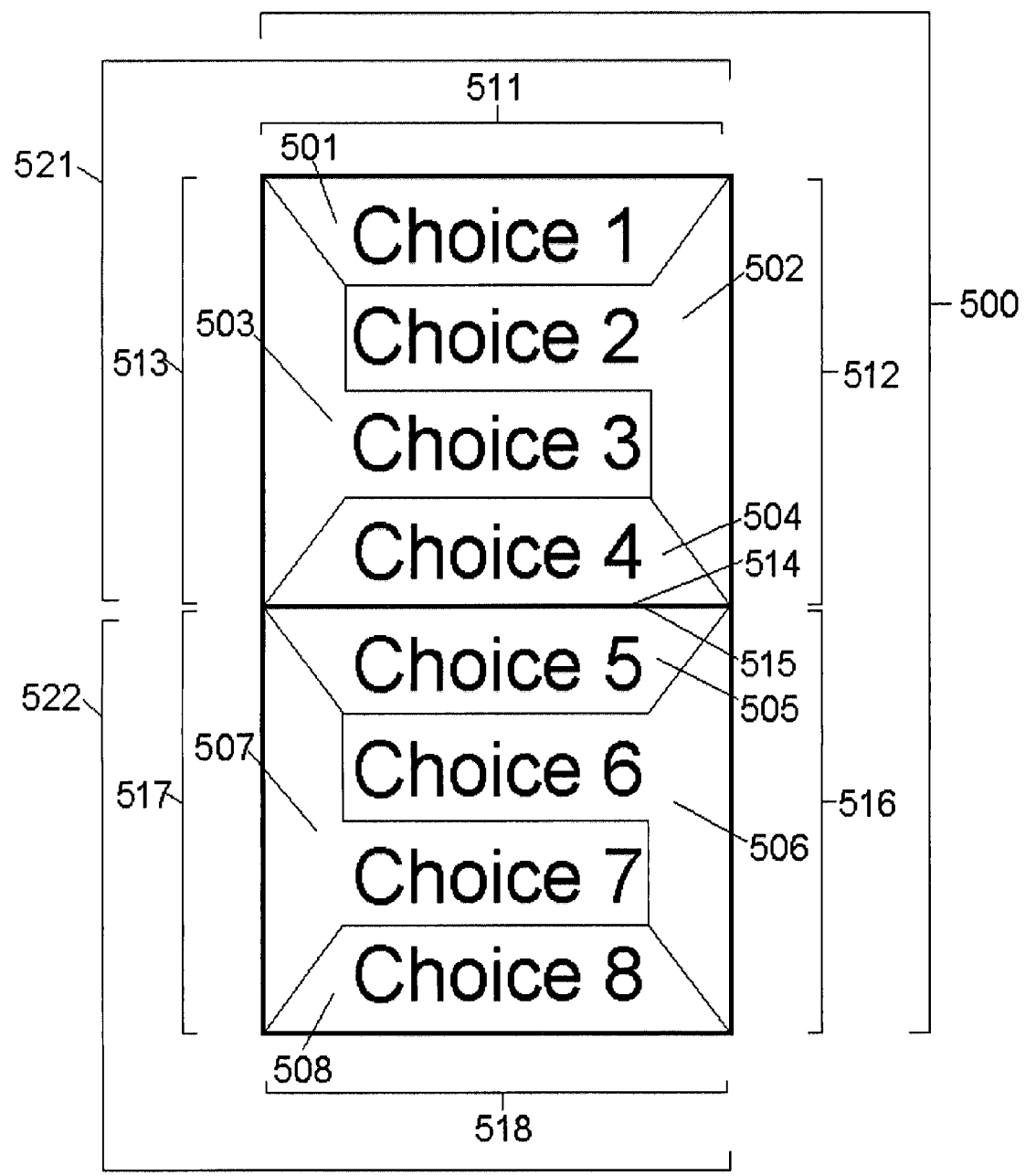
FIG. 5 shows an example of a menu that is structured in one way that takes advantage of the method of the present invention, and allows the number of presented selection choices to be increased.

The same design principle can be used effectively for menus with a larger number of choices by combining two sub-menus. FIG. 5 shows a menu 500 with eight selection sub-regions 501-508. Selection sub-regions 501-504 together comprise a first sub-menu region 521, while sub-regions 505-508 together comprise a second sub-menu region 522. The selection sub-regions 501-504 are associated with the sub-menu 521 perimeter boundary segments 511-514, and the selection sub-regions 505-508 are associated with the sub-menu 522 perimeter boundary segments 515-518. Note that the sub-menu 521 perimeter boundary segment 514 and the sub-menu 522 perimeter boundary segment 515 are in fact the same line segment (514/515), which is itself in the interior of the menu 500, rather than lying along the menu 500's outer perimeter boundary. This is not a problem, however, as the selection actions for the menu selections 504 and 505 differ in the direction in which the line segment (514/515) is crossed and the sub-menu region in which the initial contact is made. A contact action that has an initial contact location in the region of the sub-menu 521 and crosses the line segment (514/515) in a downward direction is an unambiguous selection of the menu selection 504, while a contact action that has an initial contact location in the region of the sub-menu 522 and crosses the line segment (514/515) in an upward direction is an unambiguous selection of the menu selection 505. In another embodiment, upon detecting an initial contact within the region of a sub-menu, the sub-menu containing the location of the initial contact is visually highlighted to indicate the set of menu choices (contained within that sub-menu) that may be selected by tracing a path that exits from the sub-menu by crossing the sub-menu's outer perimeter boundary.

Figure 3C:
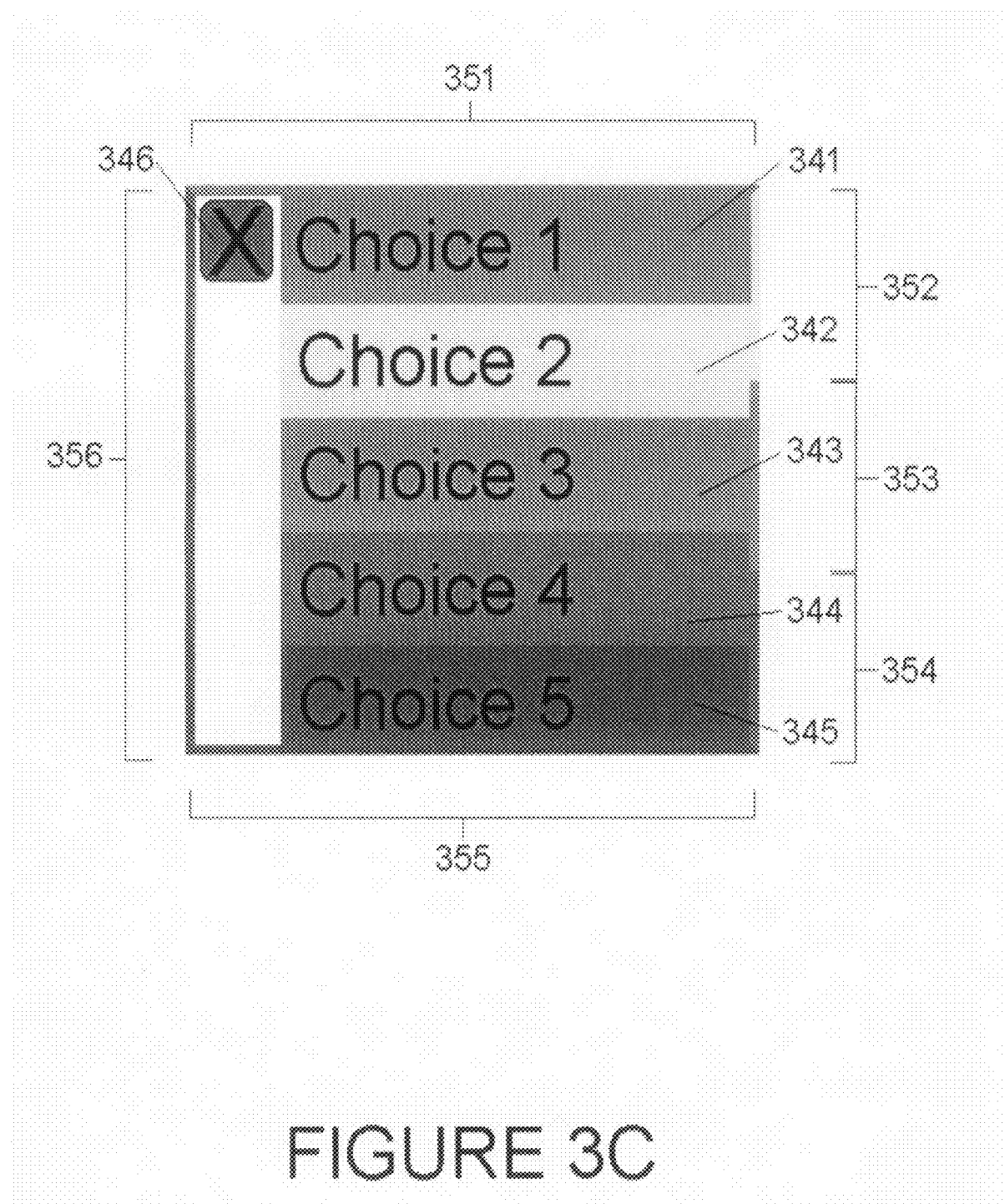
FIG. 3C shows an example of a menu that is structured in one way that takes advantage of the method of the present invention, where the boundary segments of the menu that are associated with each of the presented choices are indicated through the corresponding use of color, shading or texture in the background of the presented choices and of the associated boundary segments.

The most straightforward method to associate a segment of a menu's perimeter boundary with a menu selection choice is to associate that segment of the menu's perimeter boundary that is also part of the perimeter boundary of the menu selection choice itself (as already described above). Other methods are also possible, and are not to be considered outside of the scope of the present invention. For example, the region associated with each menu selection is displayed with a different distinguishing background (or font) color, and the associated segment of the menu's perimeter boundary is displayed in a corresponding associated (or identical) color. For example in FIG. 3C, six menu choices 341-346 are displayed with background colors of orange (341), yellow (342), green (343), blue (344), violet (345), and red (346), respectively, and the corresponding menu perimeter boundary segments are correspondingly displayed as orange (351), yellow (352), green (353), blue (354), violet (355), and red (356) segments, respectively. Alternatively, the six menu choices 341-346 could be displayed with background colors of light orange, light yellow, light green, light blue, light violet, and light red, respectively (for enhanced readability of each menu item due to the lighter background coloration), and the corresponding menu perimeter boundary segments displayed as vivid orange (351), yellow (352), green (353), blue (354), violet (355), and red (356) segments, respectively. A combination of the two approaches enables fewer colors to be utilized where the color and proximity of a perimeter boundary segment makes it clear which menu selection sub-region it is associated with. In this way, the menu can be displayed as in the example shown in FIG. 3C, where each menu selection sub-region appears as a more traditional rectangular shape, rather than the somewhat more complex appearing polygons as shown in FIG. 3A. In another aspect, patterns or shading may be used in place of color to distinguish various menu sub-regions and to associate the sub-regions with the corresponding menu perimeter boundary segments.

Figure 6:
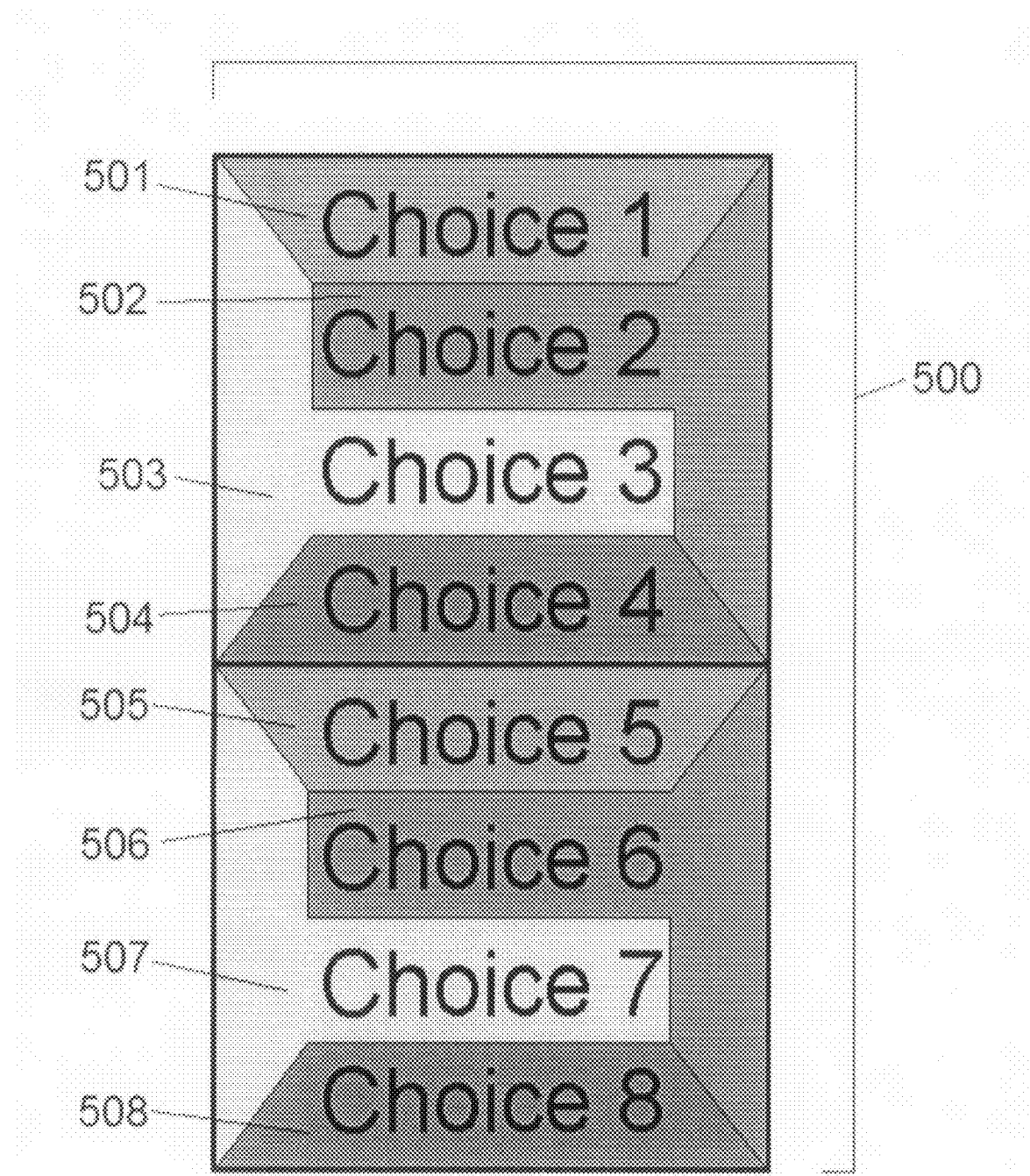
FIG. 6 shows an example of a menu that is structured in the manner illustrated in FIG. 5, and where similar background colors are used to show sets of menu choices that are selectable by similar selection gestures.

Furthermore, as shown in FIG. 6, the menu structure 500 can utilize a consistent color scheme of four colors to make the required menu selection action in each case simple and intuitive. For example, menu selection sub-regions 501 and 505 can appear with a blue background, sub-regions 502 and 506 with a red background, sub-regions 503 and 507 with a yellow background, and sub-regions 504 and 508 with a green background. Then the user need only remember: blue background—tap below and stroke upward; red background—tap nearby and stroke to the right; yellow background—tap nearby and stroke to the left; and green background—tap above and stroke downward. This particular scheme is even somewhat mnemonic: blue—"toward the sky"; green—"toward the earth"; "red to the right"; and "yellow to the left," etc. This modular approach enables menus with an arbitrary number of selection choices to be constructed using the principles of the present invention.

While the embodiment of the invention has been illustrated and described, as noted above, many changes can be made without departing from the spirit and scope of the invention. Thus the scope of the method should be determined by the appended claims and their legal equivalents, rather than by the specific aspects described above.

The embodiments of the invention in which an exclusive property or privilege is claimed are defined as follows:

1. An apparatus comprising:
   an output display device on which two or more choices for selection are graphically presented;
   an input device which detects one or more input actions performed by a user to position, move, and activate or de-activate a control point on said display; and
   a processor coupled to the input device, and the output device, the processor comprising:
   a first component for displaying a graphical presentation of said two or more choices within a defined, bounded region on said display;
   a second component for defining one or more distinct segments of the boundary of said bounded region;
   a third component for uniquely associating each of one or more of said defined segments with a distinct one of said graphically presented choices;
   a fourth component for detecting an activation of said control point within said bounded region;
   a fifth component for detecting a subsequent movement of said activated control point such that said activated control point exits said bounded region;
   a sixth component for identifying one of said distinct boundary segments through which said activated control point is moved in exiting said bounded region; and
   a sixth component for determining one of said graphically presented choices based on said identified boundary segment.

2. The apparatus of claim 1, wherein said processor further comprises:
   a seventh component for presenting each said choice within a distinct bounded sub-region within said bounded region;
   an eighth component for defining said distinct boundary segments as the boundary segments that coincide with a boundary segment of one of said sub-regions; and
   a ninth component for associating said choice presented within said sub-region with said coinciding boundary segment.

3. The apparatus of claim 1, wherein said processor further comprises:
   a seventh component for graphically presenting one or more of said choices using one or more of a color, graphical pattern, or shading and for graphically presenting each said uniquely associated defined distinct boundary segment using a comparable one or more of a color, graphical pattern, or shading.

4. The apparatus of claim 1, wherein said processor further comprises:
a seventh component for modifying the graphical presentation of said defined, bounded region upon detecting an activation of said control point within said bounded region.

5. The apparatus of claim 1, wherein the relation between the lengths of two or more of said defined boundary segments is related to the relation between determined probabilities that a user will select each of said graphically presented choices uniquely associated with each of said two or more defined boundary segments.

6. A method of graphically presenting two or more choices for selection within a defined, bounded region on an electronic display wherein a user can position, move, and activate or de-activate a control point on said display, the method comprising:
displaying a graphical presentation of said two or more choices within said bounded region;
defining one or more distinct segments of the boundary of said bounded region;
uniquely associating each of one or more of said defined segments with a distinct one of said graphically presented choices;
detecting an activation of said control point within said bounded region;
detecting a subsequent movement of said activated control point such that said activated control point exits said bounded region;
identifying one of said distinct boundary segments through which said activated control point is moved in exiting said bounded region; and
determining one of said graphically presented choices based on said identified boundary segment.

7. The method of claim 6, wherein each said choice is presented within a distinct bounded sub-region within said bounded region, and wherein said defined distinct boundary segments are defined as the boundary segments that coincide with a boundary segment of one of said sub-regions, and wherein the choice presented within said sub-region is uniquely associated with said coinciding boundary segment.

8. The method of claim 6, wherein one or more of said choices is graphically presented using one or more of a color, graphical pattern, or shading and wherein each said uniquely associated defined distinct boundary segment is presented using a comparable one or more of a color, graphical pattern, or shading.

9. The method of claim 6, further comprising modifying the graphical presentation of said defined, bounded region upon detecting an activation of said control point within said bounded region.

10. The method of claim 6, wherein the relation between the lengths of two or more of said defined boundary segments is related to the relation between determined probabilities that a user will select each of said graphically presented choices uniquely associated with each of said two or more defined boundary segments.

11. A method of inputting and editing text on an electronic device with a user interface comprising at least one input system which detects input actions of a user to generate and edit text, and at least one text presentation system through which said text is presented to said user, the method comprising:

recording the location of a text insertion position within said text presentation system where a next generated textual object will be output;
detecting a distinctive input action to identify one or more of said textual objects previously output to said text presentation system;
identifying one or more of said textual objects previously output based on the detected distinctive input action;
determining one or more alternate textual objects that correspond to one or more detected input actions from which said identified one or more textual objects was previously determined;
replacing said identified previously output one or more textual objects with one or more of said determined alternate textual objects; and
restoring said text insertion position to a location recorded prior to said detecting of said distinctive input action.

12. The method of claim 11, further comprising presenting one or more of said determined one or more alternate textual objects on the text presentation system to the user for selection of one of the presented textual objects for replacing said identified previously output one or more textual objects.

13. The method of claim 11, further comprising determining a location within said text presentation system associated with said distinctive input action, and identifying a textual object previously output to said text presentation system that is closest to said determined location.

14. The method of claim 11, further comprising automatically generating one or more spaces between one or more output textual objects.

15. The method of claim 14, further comprising identifying two or more textual objects as belonging to two or more classes of textual objects, wherein each of said two or more classes of textual objects differs from other said classes in the manner in which one or more spaces are automatically generated at least one of preceding or following the output of a textual object belonging to said class.

16. The method of claim 15, further comprising at least one of automatically inserting or automatically deleting spaces located at least one of preceding or following a textual object that replaces a textual object belonging to a different class of said classes of textual objects.

17. The method of claim 15, further comprising detecting changes in the location of said text insertion position, and modifying the manner in which one or more spaces are automatically generated at least one of preceding or following the output of a next textual object at said changed text insertion position with respect to the said classes of textual objects associated with the textual objects immediately adjacent to said changed text insertion position and with respect to any spaces immediately adjacent to said changed text insertion position.

18. The method of claim 14, further comprising detecting a distinctive user input action and disabling said automatic generation of spaces associated with the output of a next generated textual object, and automatically re-enabling said automatic generation of spaces following the output of said next generated textual object.

19. The method of claim 14, further comprising detecting a distinctive user input action and deleting the most recently generated one of said automatically generated spaces.

20. The method of claim 11, further comprising presenting two or more of said determined alternate textual objects on the text presentation system and detecting a selection by the user to identify said alternate textual object which replaces said indicated textual object.

21. The method of claim 20, wherein said user performs one or more other input actions prior to selecting any of said presented alternate textual objects as a replacement for said identified textual object, and said restoring of said text insertion position is not performed, and said identified textual object is selected as said text insertion position, such that the result of said one or more other input actions modifies or replaces said indicated textual object.

22. The method of claim 11, further comprising automatically identifying one of said determined alternate textual objects which replaces said identified textual object as being the alternate textual object that is determined to be the next most closely corresponding textual object to said detected input actions.

23. The method of claim 11, further comprising not restoring said text insertion position within said text presentation system to a location recorded prior to said detecting of said distinctive input action when said location is not located within the text that is currently visible on said text presentation system.

24. A text input and editing apparatus comprising:
one or more input devices which detect one or more input actions of a user to generate and edit text;
an output device on which generated text is presented to a user; and
a processor coupled to the input device, and the output device, the processor comprising:
a first component for recording the location of a text insertion position where a next generated textual object will be output;
a second component for detecting a distinctive input action identify one or more of said textual objects previously output to said output device;
a third component for identifying one or more of said textual objects previously output based on the detected distinctive input action;
a fourth component for determining one or more alternate textual objects that correspond to said one or more detected input actions from which said identified one or more textual objects was previously determined;
a fifth component for replacing said identified previously output one or more textual objects with one or more of said determined alternate textual objects; and
a sixth component for restoring said text insertion position to a location recorded prior to said detecting of said distinctive input action.

25. The apparatus of claim 24, wherein said processor further comprises:
a seventh component for presenting one or more of said determined one or more alternate textual objects on said output device to the user for selection of one of the presented textual objects for replacing said identified previously output one or more textual objects.

26. The apparatus of claim 24, wherein said processor further comprises:
a seventh component for determining a location within said output device associated with said distinctive input action; and
an eighth component for identifying a textual object previously output to said output device that is closest to said determined location.

27. The apparatus of claim 24, wherein said processor further comprises:
a seventh component for automatically generating one or more spaces between one or more output textual objects.

28. The apparatus of claim 27, wherein said processor further comprises:
an eighth component for identifying two or more textual objects as belonging to two or more classes of textual objects, wherein each of said two or more classes of textual objects differs from other said classes in the manner in which one or more spaces are automatically generated at least one of preceding or following the output of a textual object belonging to said class.

29. The apparatus of claim 28, wherein said processor further comprises:
a ninth component for at least one of automatically inserting or automatically deleting spaces located at least one of preceding or following a textual object that replaces a textual object belonging to a different class of said classes of textual objects.

30. The apparatus of claim 28, wherein said processor further comprises:
a ninth component for detecting changes in the location of said text insertion position, and modifying the manner in which one or more spaces are automatically generated at least one of preceding or following the output of a next textual object at said changed text insertion position with respect to the said classes of textual objects associated with the textual objects immediately adjacent to said changed text insertion position and with respect to any spaces immediately adjacent to said changed text insertion position.

31. The apparatus of claim 27, wherein said processor further comprises:
an eighth component for detecting a distinctive user input action and disabling said automatic generation of spaces associated with the output of a next generated textual object, and automatically re-enabling said automatic generation of spaces following the output of said next generated textual object.

32. The apparatus of claim 27, wherein said processor further comprises:
an eighth component for detecting a distinctive user input action and deleting the most recently generated one of said automatically generated spaces.

33. The apparatus of claim 24, wherein said processor further comprises:
a seventh component for presenting two or more of said determined alternate textual objects on said output device; and
an eighth component for detecting a selection by the user to identify said alternate textual object which replaces said indicated textual object.

34. The apparatus of claim 33, wherein said processor further comprises:
a ninth component for detecting one or more other input actions performed by said user prior to selecting any of said presented alternate textual objects as a replacement for said identified textual object; and
a tenth component for selecting said identified textual object as said text insertion position, such that the result of said one or more other input actions modifies or replaces said indicated textual object and such that said text insertion position is not restored to said prior location.

35. The apparatus of claim 24, wherein said processor further comprises:
a seventh component for automatically identifying one of said determined alternate textual objects which replaces said identified textual object as being the alternate textual object that is determined to be the next most closely corresponding textual object to said detected input actions from which said identified textual object was generated.

36. The apparatus of claim 24, wherein said processor further comprises:

a seventh component for determining whether said location of said text insertion position recorded prior to said detecting of said distinctive input action is not located within the text that is currently visible on said output device; and an eighth component for preventing said sixth component from restoring said text insertion position to said location recorded prior to said detecting of said distinctive input action when said seventh component determines that said recorded location is not located within the text that is currently visible on said output device.

* * * * *